United States Patent

[11] 3,565,297

[72] Inventors Gerardus Bladt;
Hendrik Jozef Kleintjens; Robert Ernest
Carl Herbert Tiepen, Zevenaar,
Netherlands
[21] Appl. No. 826,851
[22] Filed May 22, 1969
[45] Patented Feb. 23, 1971
[73] Assignee Lever Brothers Company
New York, N.Y.

[54] PROCESS AND APPARATUS FOR FEEDING FOODSTUFFS
6 Claims, 5 Drawing Figs.
[52] U.S. Cl. .................................................... 222/263,
100/218; 53/124
[51] Int. Cl. ...................................................... G01f 11/00
[50] Field of Search .......................................... 222/190,
16; 141/249, 81; 53/124 (E), 24; 100/41, 218;
222/261, 262, 263

[56] References Cited
UNITED STATES PATENTS
| | | | |
|---|---|---|---|
| 3,327,449 | 6/1967 | Hullhorst et al. .............. | 100/218 |
| 3,501,890 | 3/1970 | Hunt ............................ | 53/124 |

FOREIGN PATENTS
| | | | |
|---|---|---|---|
| 297,634 | 6/1954 | Austria ......................... | 100/218 |

*Primary Examiner*—Robert B. Reeves
*Assistant Examiner*—James M. Slattery
*Attorneys*—Louis F. Kline, Jr., Melvin H. Kurtz and Edgar E. Ruff ABSTRACT: Apparatus for forming volumetrically divided portions of a foodstuff, particularly a foodstuff having a fibrous texture in which the foodstuff feeds from a hopper to a supply channel via an opening closable by a wedge shaped slide with a minimum of damage to the foodstuff, the foodstuff being compressed in the supply channel by a piston into a bar, the bar being pressed into measuring chambers forming an extension of the supply channel to subdivide the bar into portions.

PATENTED FEB 23 1971

INVENTORS:

GERARDUS BLADT, HENDRIK JOZEF KLEINTJENS
AND ROBERT ERNST CARL HERBERT TIEPEL

BY

THEIR ATTORNEY

INVENTORS:
GERARDUS BLADT, HENDRIK JOZEF KLEINTJENS
AND ROBERT ERNST CARL HERBERT TIEPEL

BY

THEIR ATTORNEY

PROCESS AND APPARATUS FOR FEEDING FOODSTUFFS

The invention relates to a device for feeding a foodstuff particularly having a specific fibrous texture, such as fish or meat, in particular chicken meat, by volumetrically subdividing a number of portions of equal weight.

It is known to form a number of portions of a product simultaneously by means of a plurality of measuring chambers of equal capacity, which are simultaneously filled with the product and subsequently emptied. Although in this way a high production rate can be achieved, it requires that the produce to be filled should have a uniform density, so as to ensure a uniform and constant weight of the formed portions of the product. To certain foodstuffs, such as for instance meat, a fairly uniform density can be imparted by mincing them very finely. Although mincing of the starting product is in no way objectionable in the manufacture of certain articles, such as e.g. minced meat balls or meat or fish pastes, it may form an unsurmountable objection in the manufacture of other meat or fish products or of another foodstuff having a significantly fibrous texture. Thus, for instance, on dosing chicken meat in the preparation of canned soup or chicken pies, where the final product must contain whole pieces of meat, it is desirable for the chicken meat to sustain the least possible damage. By "the least possible damage" it is understood that the pieces of meat retain as much as possible their original fibrous texture and are recognizable as such by the consumer of the final product.

According to the present invention there is provided apparatus for forming volumetrically divided portions of a foodstuff comprising a hopper for receiving pieces of a foodstuff, a supply channel located adjacent to the hopper and adapted to receive pieces of the foodstuff from the hopper, a dividing wedge which is movable in a direction which is oblique to the axis of the supply channel so as to penetrate between pieces of the foodstuff lying at a transition zone between the hopper and the channel, compress pieces of the foodstuff within the supply channel and then close off the channel by forming part of a wall section thereof, a piston within said channel which is arranged to further compress pieces of the foodstuff within the channel to form a coherent bar of substantially constant density and cross section, and means for subdividing portions from said bar.

Preferably the apparatus comprises measuring chamber means has a total cross section substantially corresponding geometrically to the cross-sectional area of the bar, located to receive the end of the bar when forced there into by said piston, and arranged to move transversely to the bar to subdivide at least one portion of the foodstuff therefrom.

The measuring chamber means can comprise a plurality of thin dividing walls located in planes parallel to the bar, and dividing the measuring chamber means into a plurality of measuring chambers. These walls should be so thin that their cross-sectional area is insignificant compared to the total cross-sectional area of the bar. Thus the cross section of the bar can be subdivided into a number of unit portions.

Conveniently the piston is arranged to maintain pressure on the bar during transverse movement of the measuring chamber mean, to subdivide each portion of the foodstuff from the bar. This ensures that the density of the material remains constant during the subdividing operation.

Preferably pressure ejection means is provided for applying pressure to eject each portion of the foodstuff from the measuring chamber means, the pressure ejection means being arranged to remain actuated until the measuring chamber means has been moved transversely back to receive a further portion from the end of the bar. This prevents material being received in the measuring chamber means before it is completely located in position, so minimizing the occurrence of shearing stresses in the compressed bar.

The supply channel is preferably of rectangular cross section to form rectangular dice and the wedge is shaped to form a portion of a flat wall section of said channel.

Embodiments of the invention will now be more particularly described by way of example with reference to the accompanying diagrammatic drawings in which.

Figure 1:
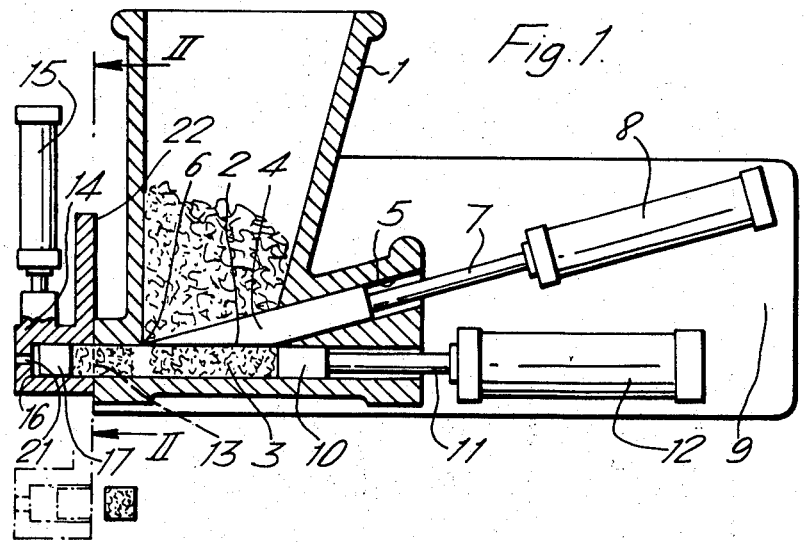
FIG. 1 is a longitudinal section through a first embodiment of the apparatus.

Each of the embodiments of the apparatus shown in FIGS. 1—5 comprises a supply hopper 1, which in plan view is rectangular and in vertical cross section converges inwardly towards the bottom. The top of the hopper 1 is open and forms a filling opening, the rectangular bottom face 2 of the hopper also being open and opening into a supply channel 3 of rectangular cross section, the width of the top opening of the hopper being equal to the width of the bottom surface 2 of the supply hopper. The connection between the interior of the supply hopper 1 and the channel 3 can be opened and closed by means of a dividing wedge formed by a slide 4, which in top view is rectangular and in vertical section trapezoidal. This slide 4 is slidably supported in a guide way 5, the longitudinal axis of which is at an acute angle to the longitudinal axis of the supply channel 3. The front of of the slide 4 is flattened to a knife edge 6, in such a way that the slide, in the position in which it has closed the connection between the interior of the supply hopper 1 and of the channel 3, forms part of the upper wall of the channel 3. The slide 4 is rigidly connected to the piston rod 7 of a pneumatic cylinder 8, mounted on the frame 9 of the apparatus.

The supply channel 3 is closed at one end of a piston 10, connected to the piston rod 11 of a second pneumatic cylinder 12, which is likewise mounted on the frame 9. In the embodiments shown in FIGS. 1—4 the channel 3 terminates at the other end in an outlet opening 13, against which a block 14 is arranged which can be moved up and down by means of a pneumatic cylinder 15 mounted on the frame 9.

Figure 2:
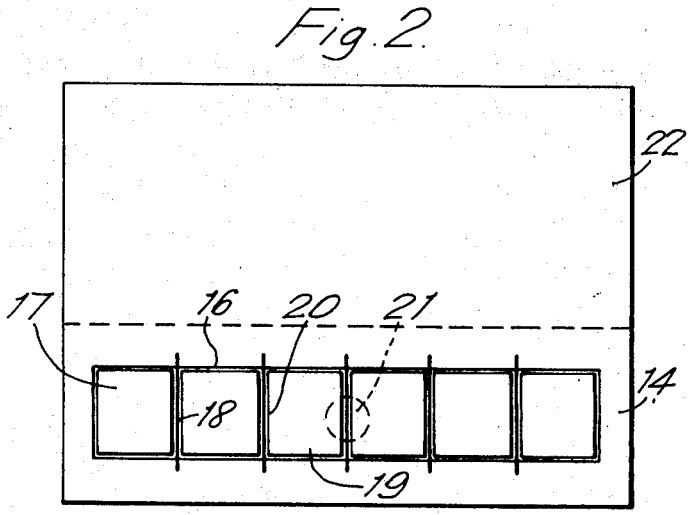
FIG. 2 is a sectional view on an enlarged scale taken on the line II–II of FIG. 1.

The block 14 comprises a recess 16, the cross section of which corresponds to the cross section of the channel 3, and in which a number of very thin, vertical partitions 18 is provided, dividing the recess 16 into a number of equal measuring chambers 19 (FIG. 2). In the embodiments shown the partitions 18 divide the recess 16 into six measuring chambers.

Figure 3:
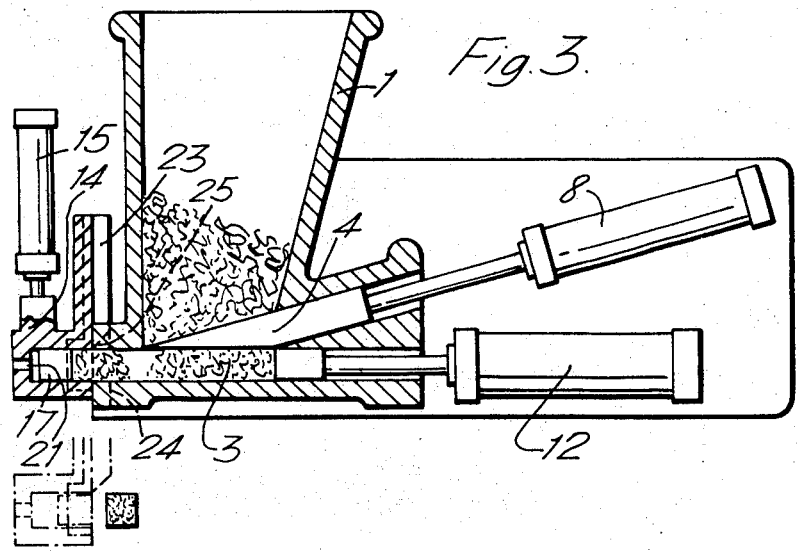
FIG. 3 is a longitudinal section through a second embodiment.
Figure 4:
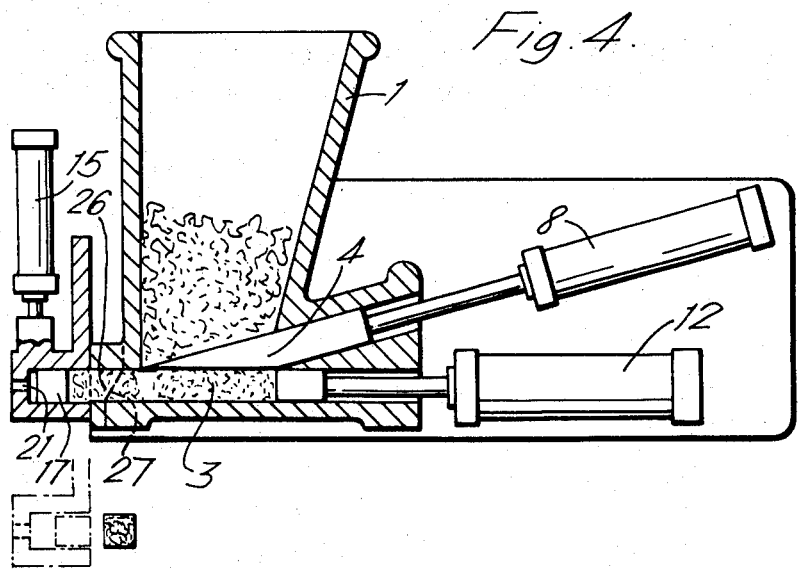
FIG. 4 is a longitudinal section through a third embodiment.

Pressure ejection means comprising a beam 17 is slidably mounted in the recess 16, the beam 17 having a number of slots 20, corresponding with the partitions 18, the partitions 18 extending into the slots 20 in any position of the beam 17. The depth of the slots 20 is such that the bottoms of the slots 20 abut against the back edges of the partitions 18 when the beam 17 has reached the ejection position. The ejection position of the beam 17 is indicated in FIGS. 1, 3 and 4 in dotted lines.

In this way, sections of the beam 17 lying between the slots 20 each form a piston of one of the measuring chambers 19, the bottom of the recess 16 being provided with an aperture 21, to which a compressed air line can be connected.

The operation of the apparatus shown in FIGS. 1—4 is as follows:

When the hopper 1 has been filled, via its open top, with lumps of the foodstuff to be dosed, the cylinder 8 is actuated in such a way that the slide 4 opens the connection between the interior of the supply hopper and of the channel. It is also possible, however, to fill the hopper 1 in opened position of the slide 4, in which case part of the lumps of foodstuff supplied falls direct into the channel 3. As soon as channel 3 is not filled further by the proper weight of the mass of foodstuff in hopper 1, cylinder 8 is actuated to bring the slide 4 into the closed position shown. During this operation the knife edge 6 of the slide penetrates between the lumps of foodstuff, while the quantity of lumps of foodstuff lying under the flattened end of the slide is compressed to some extent. Since the flattened end of the slide 4 during its closing movement not only moves downwards but forwards to an even greater extent, and also because of its wedge shape the closing movement of the slide exerts a splitting action rather than a cutting action on the mass of the lumps of foodstuff. The lumps of foodstuff in the channel 3 tend to take up such a position that the direction of their fibers becomes parallel to the longitudinal axis of the channel 3. When the slide 4 has reached the closed position shown, the pneumatic cylinder 12 is actuated, so that the piston 10 compresses the lumps of foodstuff in the channel 3 to a specific pressure into a bar. During this compression the air between the lumps of foodstuff escapes past the slide 4 and past the abutting faces of the housing of the apparatus and of the block 14. The lumps of foodstuff in the channel are thus compressed to a homogeneous bar, which no longer contains any cavities.

When the block 14 is in the position shown in the FIGS. in full lines, the end of the bar is pressed into the measuring chambers 19, the aperture 21 then being in open communication with the ambient air and the beam 17 being moved backwards by the pressure exerted by the bar to such an extent that it comes to rest against the bottom of the recess. Since the partitions 18 consist of thin plates, the cross section of the bar on filling the measuring chambers remains substantially constant, thus minimizing any damage to the lumps of foodstuff.

After the measuring chambers 19 have been completely filled, the cylinder 15 is actuated, moving the block 14 into the position shown in the FIGS. in dotted lines. As a result of this the bar is cut off according to the plane of the line II–II (FIG. 1), after which the outlet opening of the channel 3 is kept closed by the plate 22 of the block 14. When the block 14 has reached the position shown in dotted lines, compressed air is supplied via aperture 21, so that the beam 17 is moved towards the ejection position and the portions of foodstuff formed into blocks are ejected, as shown schematically in the drawing.

Since both during filling and during ejection the pneumatic cylinder 12 remains constantly actuated, the beam 17 after having emptied the measuring chambers is held in the ejection position by maintaining the air pressure on the aperture 21 until the cylinder 15 has returned the block 14 to the position shown in full lines. The pressure of the air supplied via the aperture 21 is high enough to prevent the beam 17 from moving backwards in the measuring chambers due to the pressure exerted by the bar of foodstuff in the channel 3 as soon as the recess 16 comes again into open communication with the channel 3. Only after the block 14 has reached the position shown in full lines is the aperture 21 again brought into communication with the atmosphere, allowing the beam to be moved by the pressure of the bar, so that the measuring chambers are filled once more. Since the beam 17 is held in the ejection position until block 14 has regained its filling position, the lumps of foodstuff are prevented from being damaged or falling apart into separate fibers.

When after a number of strokes of the block 14 the piston 10, moved forward by the cylinder 12, has reached a final position in which it approaches the outlet opening 13 of the channel, it is moved back to its starting position, during which the slide 4 is opened and a new quantity of lumps of foodstuff falls into the channel.

The apparatus shown in FIG. 3 differs from the apparatus of FIG. 1 in that the partitions between the measuring chambers are each integral with a knife 23 extending beyond the block, which knives are guided in slots 24 of the housing of the apparatus. The cutting edge 25 of each knife 23 is arranged obliquely with respect to the longitudinal axis of the channel 3, these cutting edges being withdrawn to a position outside the periphery of the channel when the block 14 takes up the position shown in full lines. When the block 14 is moved downwards, the cutting edge will thus make a number of incisions in the end of the bar in the channel 3, which incisions are in line with the partitions 18, when the block has again reached its filling position. During the subsequent filling of the measuring chambers 19 the partitions 18 will thus cause even less damage to the lumps of foodstuff.

In the apparatus shown in FIG. 4 a number of fixed knives 26 is provided near the outlet opening 13 of the channel 3, the planes of said knives lying in the planes of the partitions 18 and their cutting edges 27 extending obliquely over the full height of the channel. Owing to the relative movement between the bar in the channel 3 and the knives 26 during filling of the measuring chambers, incisions are thus provided in the bar before it reaches the measuring chambers to minimize the damage to the foodstuff by the partitions 18.

Figure 5:
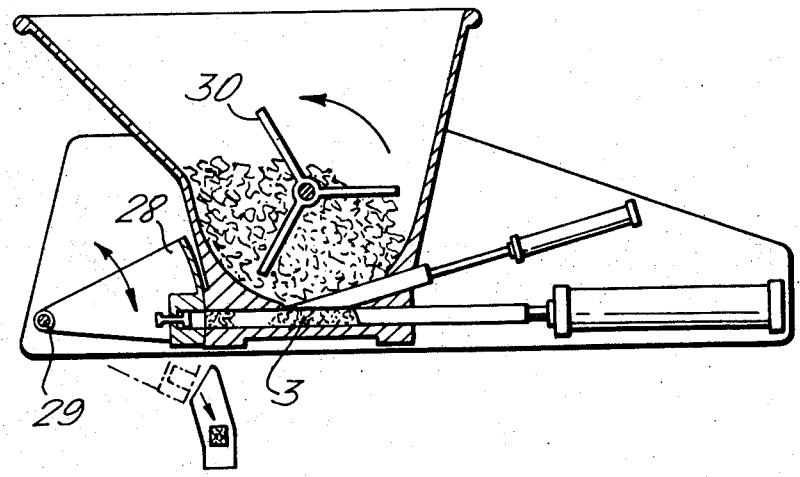
FIG. 5 is a longitudinal section through a fourth embodiment.

The apparatus shown in FIG. 5 differs from the apparatus shown in FIG. 1–4 in that the block 28 containing the measuring chambers oscillates around a fixed pivot 29. The block 28 is shaped as a segment of a circle, the cylindrical surface of which is constantly in contact with a corresponding cylindrical surface of the housing of the apparatus. Furthermore, the hopper contains a stirring device 30, which promotes filling of the channel with lumps of foodstuff by their own weight, when the slide between hopper and supply channel is in open position. Such a stirring device, which does not form part of the invention, could also be used in the embodiments of FIGS. 1–4.

In experiments with the apparatus as shown in FIGS. 1 and 2, chicken meat was dosed in portions of 16 grams, the lumps of chicken meat being compressed in the channel 3 to an effective pressure of 2 kg./sq.cm. This is obtaining cubes of practically undamaged chicken meat of 16 grams, which showed a standard deviation of only 0.245 grams, i.e. a deviation in weight of only 1.53 percent. In these experiments the apparatus worked at a rate of 30 strokes/min. of the block 14 containing the measuring chambers, so that 180 portions of the foodstuff were measured per minute.

We claim:

1. Apparatus for forming volumetrically divided portions of a foodstuff comprising:
   a hopper for receiving pieces of a foodstuff;
   a supply channel located adjacent to the hopper and adapted to receive pieces of the foodstuff from the hopper;
   a dividing wedge which is movable in a direction which is oblique to the axis of the supply channel so as to penetrate between pieces of the foodstuff lying at a transition zone between the hopper and the channel, compress pieces of the foodstuff within the supply channel and then close off the channel by forming part of a wall section thereof;
   a piston within said channel which is arranged to further compress pieces of the foodstuff within the channel to form a coherent bar of substantially constant density and cross section; and
   means for subdividing portions from said bar.

2. Apparatus according to claim 1, comprising measuring chamber means having a total cross section substantially corresponding geometrically to the cross-sectional area of the bar, located to receive the end of the bar when forced there into by said piston, and arranged to move transversely to the bar to subdivide at least one portion of the foodstuff therefrom.

3. Apparatus according to claim 2, in which said measuring chamber means comprises a plurality of thin dividing walls located in planes parallel to the bar, and dividing the measuring chamber means into a plurality of measuring chambers.

4. Apparatus according to claim 2, in which said piston is arranged to maintain pressure on the bar during transverse movement of the measuring chamber means, to subdivide each portion of the foodstuff from the bar.

5. Apparatus according to claim 4, comprising pressure ejection means for applying pressure to eject each portion of the foodstuff from the measuring chamber means, the pressure ejection means being arranged to remain actuated until the measuring chamber means has been moved transversely back to receive a further portion from the end of the bar.

6. Apparatus according to claim 1, in which said supply channel is a rectangular cross section to form rectangular dice and the wedge is shaped to form a portion of a flat wall section of said channel.